United States Patent Office 3,095,379
Patented June 25, 1963

3,095,379
METAL CLEANING COMPOSITIONS
Hyman Schwartz, 1150 S. Beverly Drive,
Los Angeles 35, Calif.
No Drawing. Filed July 26, 1960, Ser. No. 45,284
4 Claims. (Cl. 252—101)

This invention relates to novel metal cleaning compositions, particularly including certain reaction products of citric acid as hereinafter set forth.

An object of the invention is to provide novel metal cleaning compositions, comprising a metal cleaning acid and a chemical product resulting from the reaction of citric acid with monoethanolamine as hereinafter set forth:

Another object of the invention is to provide a novel anti-corrosive agent, especially for use in metal cleaning, metal pickling and like uses.

Other objects of the invention will become apparent as the description thereof proceeds.

It is possible, of course, to neutralize citric acid with various bases, which may be organic or inorganic. For example, if a dilute aqueous solution of citric acid is prepared and monoethanolamine is added thereto, monoethanolammonium citrate will be formed by the standard acid-base reaction. One, two, or three of the carboxyl radicals of the citric acid molecule can be neutralized in this fashion by adding, respectively, an equimolar, twice an equimolar, and thrice an equimolar quantity of monoethanolamine.

Quite in contrast to the simple salts obtained in the fashion just described, if citric acid and monoethanolamine are mixed together and then heated to a temperature within the range of approximately 150° C. to 180° C., the monoethanolamine being present in the proportion of from 1 to 2 mols thereof for each mol of citric acid, and the mixture being held at a temperature within this range for a sufficiently long time for the evolution of gases therefrom to cease, then a remarkable product results which is quite different from the simple neutralization salt, and which has outstanding properties of corrosion inhibition when used, for example, in metal pickling and metal etching baths.

The citric acid may be crystalline or anhydrous and the monoethanolamine may be 100% pure or may contain some water. It will be appreciated that almost any quantity of water in the initial mixture is unimportant, since it will be flashed off in the course of bringing the temperature of the mixture up to within the range which has been given, which, of course, is far above the boiling point of water. As a practical matter, I prefer and find that it is best to use the commercially available U.S.P. anhydrous citric acid, and likewise I preferably use the commercially available monoethanolamine, which is usually substantially anhydrous.

Some examples will now be given of the preparation of the reaction product for use in accordance with my invention:

Example I

One-hundred ninety-two grams of anhydrous citric acid in fine granular form were stirred into 122 grams of monoethanolamine. (Thus, two mols of the latter were used to one mol of citric acid.) The temperature rose at once to about 165° C., and the mixture was brought to and maintained at about 175° C. by means of a hot plate. Carbon dioxide and other vapor evolved briskly from the mixture, and after a total reaction time of 5 minutes, evolution of gases had ceased. The mixture was allowed to cool, and formed a highly viscous liquid of medium amber color considerably thicker than honey, but pourable from a container.

A second example shows an alternative preparation:

Example II

The process of Example I was carried out except that only 61 grams of monoethanolamine were used. (Thus, the reactants were equimolar.) The product obtained was light amber in color and transparent, and while initially a thick syrup, eventually set up to a solid isotropic transparent mass.

It will be clear that numerous modifications are possible in the production of the chemical product for use in accordance with my invention. Thus, 1½ mols of monoethanolamine may be used per mol of citric acid. Again, the reaction may be carried out at a temperature as low as 150° C., but the time necessary to complete the reaction, as judged by the cessation of gas evolution, is so long that this temperature is not as convenient as higher ones. Below about 150° C., for example at 145° C., there is no evidence of any reaction taking place other than simple neutralization, and the product obtained by simple neutralization, as will be shown, is not operative in accordance with the invention.

Similarly, temperatures higher than 180° C., such as, for example, 185° C., and higher, are to be avoided because at such elevated temperatures the citric acid itself decomposes at a rapid rate, and the novel products which I obtained in the range 150° C. to 180° C. are not achieved.

The products obtained for use in accordance with the invention are freely water-soluble, and are slightly acid. For example, the product of Example I exhibits a pH of about 4½ in dilute aqueous solution, while that of Example II exhibits a pH of slightly in excess of 3, about 3.1, in dilute aqueous solution.

The products obtained for use in accordance with the invention may be used by themselves, preferably after dilution with water, as a cleansing agent, particularly for metal cleaning, and for removing scale of various kinds, particularly calcium carbonate scale. A wider field of usefulness for the type of chemical product described is in conjunction with dilute aqueous solutions of acids, such as are used for metal cleaning, scale removal, pickling baths, especially in connection with plating operations, and the like. I have successfully used the chemical products in accordance with my invention in acid cleaning baths in which the acid was nitric, hydrochloric, sulfuric, phosphoric, and citric, and have found that in all cases a relatively small amount of my compound greatly decreases the loss of metal to the acid solution, both at room temperature and at elevated temperature. As little as 1/20% of the inventive chemical product dissolved in an aqueous acid solution contributes an appreciable amount of inhibition of metal dissolution. Indeed, as little as ⅕% is sufficiently effective that it may be used in commercial practice. Larger amounts of my additive do no harm, but, of course, increase the total cost of a given cleaning operation. In many instances, however, when the metal to be protected is especially expensive, as is the case with many rare and specialized metals used in the electronic industry, it is economically attractive to use a larger proportion of my inventive chemical products, say 10% to 20% in aqueous solution, with or without an added acid, for cleaning and surface treating operations on the metals in question, so as to hold their dissolution down to a negligible figure. It may thus be seen that there is no upper limit to the concentration which is usable.

Some examples will now be given of the usefulness of these products in corrosion inhibition:

Example A

Five grams of the product of Example I was mixed with 40 grams of 70% phosphoric acid and 225 grams of water. A control acid bath was made up with the same quantities of acid and water, but omitting the inventive product. When coupons of 1020 type cold rolled steel were immersed at room temperature for seven hours in the two solutions, the penetration in mils for the control was 0.0745, while that for the one containing the 5 grams of the product of Example I was only 0.0445.

Example B

Acid solutions were made up exactly as in Example A above, except that concentrated sulfuric acid was used in place of 70% phosphoric acid. Cold rolled steel was tested at room temperature for seven hours, and the penetrations for the control and for the solution containing the inventive product were, respectively, 0.0955 and 0.0500.

Example C

The same solutions as used in Example B were tested on copper coupons. The mils penetration for the control solution was 0.008, while that for the solution containing the product of Example I was zero. No weight loss in the latter was detectable even using an analytical balance sensitive to 0.1 milligram.

Example D

Solutions were made up as in Example A except substituting 70% nitric acid for the 70% phosphoric acid. Tests as in Example A on cold rolled steel showed 7.4560 mils penetration for the control solution and only 2.8400 for the solution containing the inventive additive.

Example E

The two solutions of Example D were tested on copper, other conditions being the same as in Example D. The mils penetration was 5.4480 for the control solution, and 1.3390 for the solution containing the inventive additive.

As remarked, mixing the citric acid and the monoethanolamine under conditions such that the temperature never reaches or exceeds 150° C. does not lead to any chemical product useful in the compositions described and claimed herein. The chemistry of the reactions which take place in the inventive temperature range is very complex, and a preliminary investigation has not shed any light on the exact nature of the compounds present. The empirical results, however, are clear beyond any doubt. The corrosion inhibiting action of these materials has been shown in the examples hereinabove. The relative ineffectiveness of the chemical compounds resulting from reaction of citric acid and monoethanolamine at temperatures less than the claimed range is shown by the following series of tests:

Example F

Five grams of the product of Example I was dissolved in a solution consisting of 25 grams of 70% nitric acid and 470 grams of water. A control solution was made by adding 3.2 grams of citric acid to a solution consisting of 25 grams of 70% nitric acid and 470 grams of water, after which 1.8 grams of monoethanolamine were added. Thus, both solutions contained the same ingredients, except that in the first, the citric acid and the monoethanolamine had been reacted at a temperature of 175° C., whereas in the control solution, the temperature was substantially room temperature at all times. Coupons of 1020 type cold rolled steel were immersed in both solutions at room temperature for ten hours. The mils penetration was 3.9110 for the solution containing the product of Example I; whereas the mils penetration for the control solution was 8.0285.

Example G

An acid bath was made up in the proportions of 40 grams 70% phosphoric acid and 225 grams of water. To separate 265 gram solutions thereof, there were added, respectively: (a) 5 grams of the product of Example I; (b) the product resulting from reacting 3.2 grams of citric acid and 1.8 grams of monoethanolamine at 140° C.; and (c) the product resulting from reacting 3.2 grams citric acid and 1.8 grams monoethanolamine at 130° C. Preparations (b) and (c) thus represent the same starting materials as preparation (a), except that lower temperatures were used. Coupons of 1020 type cold rolled steel were immersed for seven hours, and the metal loss determined as follows, in mils (0.001 inch) penetration:

(a) 0.0445
(b) 0.0697
(c) 0.0720

The superiority of the product made at the higher temperature as set forth in Example G above is striking. Similar tests using other acids and other monoethanolamine ratios of the reactants within the inventive range have led to similar results, on a diversity of metals.

It may be mentioned that all acids commonly employed in metal cleaning may be used in practicing my invention. Besides those mentioned earlier, sulfamic acid is quite useful.

While my invention has been ilustrated in terms of and with the aid of specific examples, it will be understood that various modifications and changes may be made in proportions, details of procedure, and the like, all within the broad scope of the invention as defined in the claims that follow.

Having described the invention, I claim:

1. A metal cleaning composition consisting essentially of a dilute aqueous solution of a water soluble acid and at least 1/20% of the chemical product resulting from the reaction of citric acid and a quantity of monethanolamine within the range of proportions of equimolar to twice equimolar at a temperature maintained within the range 150° C. to 180° C. until evolution of gas ceases.

2. A metal cleaning composition consisting essentially of a dilute aqueous solution of a water soluble acid chosen from the group consisting of sulfuric, hydrochloric, nitric, sulfamic, phosphoric, and citric, and at least 1/20% of the chemical product resulting from the reaction of citric acid and a quantity of monethanolamine within the range of proportions of equimolar to twice equimolar at a temperature maintained within the range 150° C. to 180° C. until evolution of gas ceases.

3. The metal cleaning composition of claim 2 wherein the acid is sulfuric.

4. The metal cleaning composition of claim 2 wherein the acid is phosphoric.

References Cited in the file of this patent

UNITED STATES PATENTS

| | | |
|---|---|---|
| 2,094,608 | Kritchevsky | Oct. 5, 1937 |
| 2,801,979 | Hagar et al. | Aug. 6, 1957 |
| 2,807,585 | Gardner et al. | Sept. 24, 1957 |
| 2,924,571 | Hughes | Feb. 9, 1960 |